United States Patent
Theuer et al.

(10) Patent No.: US 10,220,474 B2
(45) Date of Patent: Mar. 5, 2019

(54) METHOD AND APPARATUS FOR GAS TURBINE COMBUSTOR INNER CAP AND HIGH FREQUENCY ACOUSTIC DAMPERS

(71) Applicant: General Electric Company, Schenectady, NY (US)

(72) Inventors: Andre Theuer, Baden (CH); Dariusz Oliwiusz Palys, Gebenstorf (CH); Jost Imfeld, Scherz (CH)

(73) Assignee: General Electricd Company, Schenectady, NY (US)

( * ) Notice: Subject to any disclaimer, the term of this patent is extended or adjusted under 35 U.S.C. 154(b) by 88 days.

(21) Appl. No.: 15/367,245

(22) Filed: Dec. 2, 2016

(65) Prior Publication Data

US 2018/0156460 A1    Jun. 7, 2018

(51) Int. Cl.
*F23R 3/00* (2006.01)
*B23K 26/342* (2014.01)
(Continued)

(52) U.S. Cl.
CPC ............ *B23K 26/342* (2015.10); *B33Y 10/00* (2014.12); *B33Y 80/00* (2014.12); *F23R 3/002* (2013.01);
(Continued)

(58) Field of Classification Search
CPC .. F23R 2900/00014; F23R 3/002; F23R 3/16; F05D 2260/96; F05D 2260/963; F05D 2270/14
See application file for complete search history.

(56) References Cited

U.S. PATENT DOCUMENTS 3,791,692 A    2/1974  Piere
4,628,689 A   12/1986  Jourdan
(Continued)

FOREIGN PATENT DOCUMENTS

DE   19603979 A1    8/1997
GB    2452476 A   11/2009
(Continued)

OTHER PUBLICATIONS

Paramita Das, Ramya Chandran, Rutuja Samant, Sam Anand, Optimum Part Build Orientation in Additive Manufacturing for Minimizing Part Errors and Support Structures, Procedia Manufacturing, vol. 1, 2015, pp. 343-354.*
(Continued)

*Primary Examiner* — Craig Kim
(74) *Attorney, Agent, or Firm* — Charlotte C. Wilson; Ernest G. Cusick; Frank A. Landgraff

(57) ABSTRACT

A method of making a combustor cap assembly uses an additive manufacturing process of consecutively adding material in layers along an upstream axial build direction starting from a base side positioned transverse to the upstream axial build direction. The base side has at least one acoustic port. A bump side extends from the base side in the upstream axial build direction and has at least one damper projecting from the bump side. The damper has at least one inclined face forming an angle with the upstream axial build direction of less than or equal to 45 degrees. The resulting cap assembly includes a hot side with an acoustic port and a cold side with at least one damper with an inclined face and a damper chamber in communication with the acoustic port.

17 Claims, 13 Drawing Sheets

(51) Int. Cl.
  *B33Y 10/00* (2015.01)
  *B33Y 80/00* (2015.01)
  *F23R 3/16* (2006.01)
  *B23K 101/00* (2006.01)

(52) U.S. Cl.
  CPC .......... *F23R 3/16* (2013.01); *B23K 2101/001* (2018.08); *F05D 2260/96* (2013.01); *F05D 2260/963* (2013.01); *F05D 2270/14* (2013.01); *F23R 2900/00014* (2013.01); *F23R 2900/00018* (2013.01)

(56) References Cited

U.S. PATENT DOCUMENTS

| | | | |
|---|---|---|---|
| 5,290,973 A | 3/1994 | Kwoh | |
| 5,373,695 A * | 12/1994 | Aigner | F23R 3/02 60/725 |
| 5,431,018 A * | 7/1995 | Keller | F23R 3/28 431/114 |
| 5,478,207 A | 12/1995 | Stec | |
| 5,522,705 A | 6/1996 | Elaini et al. | |
| 5,599,165 A | 2/1997 | Elaini et al. | |
| 5,812,496 A | 9/1998 | Peck | |
| 5,953,414 A | 9/1999 | Abraham et al. | |
| 6,413,050 B1 | 7/2002 | Shimovetz | |
| 6,581,722 B2 | 6/2003 | Faulhaber et al. | |
| 6,682,219 B2 | 1/2004 | Alam et al. | |
| 6,802,405 B2 | 10/2004 | Barcock et al. | |
| 6,917,200 B2 | 7/2005 | Dronbnitzky | |
| 7,080,514 B2 * | 7/2006 | Bland | F23M 20/005 181/213 |
| 7,291,946 B2 | 11/2007 | Clouse et al. | |
| 7,334,408 B2 * | 2/2008 | Bethke | F23R 3/002 181/213 |
| 7,357,220 B2 | 4/2008 | Horikou | |
| 7,413,053 B2 * | 8/2008 | Wasif | F23M 20/005 181/210 |
| 7,413,808 B2 | 8/2008 | Burd et al. | |
| 7,841,368 B2 | 11/2010 | McMasters et al. | |
| 7,931,117 B2 | 4/2011 | Payot et al. | |
| 8,167,091 B2 | 5/2012 | Alecu et al. | |
| 8,171,734 B2 | 5/2012 | McMasters et al. | |
| 8,210,211 B2 | 7/2012 | McMasters et al. | |
| 8,216,687 B2 | 7/2012 | Burd et al. | |
| 8,336,313 B2 | 12/2012 | McMasters et al. | |
| 8,469,141 B2 * | 6/2013 | Wang | F23R 3/002 181/212 |
| 8,499,893 B2 | 8/2013 | Alecu et al. | |
| 8,657,067 B1 | 2/2014 | Mathur | |
| 8,684,130 B1 | 4/2014 | Bothien et al. | |
| 8,720,204 B2 * | 5/2014 | Schilp | F23R 3/002 181/213 |
| 8,733,496 B2 | 5/2014 | Ono et al. | |
| 8,943,825 B2 | 2/2015 | Magni et al. | |
| 8,978,250 B2 | 3/2015 | Barcock et al. | |
| 9,253,870 B2 | 2/2016 | Willmot et al. | |
| 9,309,809 B2 | 4/2016 | Johnson et al. | |
| 9,316,156 B2 | 4/2016 | Matsuyama et al. | |
| 9,334,804 B2 | 5/2016 | Bothien et al. | |
| 9,429,042 B2 | 8/2016 | Genin et al. | |
| 9,709,279 B2 * | 7/2017 | Crothers | F23R 3/04 |
| 9,845,732 B2 * | 12/2017 | Crothers | F23N 1/022 |
| 2004/0126247 A1 | 7/2004 | Broser et al. | |
| 2007/0012530 A1 | 1/2007 | Garcia | |
| 2007/0141375 A1 | 6/2007 | Budinger et al. | |
| 2007/0181362 A1 | 8/2007 | Champney et al. | |
| 2009/0255602 A1 | 10/2009 | McMasters et al. | |
| 2012/0288807 A1 * | 11/2012 | Kim | F23R 3/002 431/114 |
| 2013/0019602 A1 * | 1/2013 | Kim | F23R 3/10 60/725 |
| 2014/0013756 A1 * | 1/2014 | Melton | F02C 7/22 60/725 |
| 2014/0096537 A1 | 4/2014 | McMahon | |
| 2014/0150435 A1 | 6/2014 | Maurer et al. | |
| 2014/0212317 A1 | 7/2014 | Garry | |
| 2014/0241871 A1 | 8/2014 | Gregory et al. | |
| 2014/0311156 A1 * | 10/2014 | Tretyakov | F23R 3/10 60/779 |
| 2014/0345284 A1 | 11/2014 | Bothien et al. | |
| 2015/0047357 A1 | 2/2015 | Schuermans et al. | |
| 2015/0075168 A1 | 3/2015 | De Jonge et al. | |
| 2015/0113990 A1 | 4/2015 | Eroglu | |
| 2015/0113991 A1 | 4/2015 | Tonon et al. | |
| 2015/0113992 A1 | 4/2015 | Tonon et al. | |
| 2015/0315972 A1 | 11/2015 | Lumbab et al. | |
| 2015/0342022 A1 | 11/2015 | Willmot et al. | |
| 2015/0377487 A1 | 12/2015 | Tonon et al. | |
| 2016/0013652 A1 | 1/2016 | Li et al. | |
| 2016/0017805 A1 * | 1/2016 | DiCintio | F02C 7/16 60/737 |
| 2016/0056578 A1 | 2/2016 | Taylor | |
| 2016/0057873 A1 | 2/2016 | Richardson et al. | |
| 2016/0069213 A1 | 3/2016 | Fitt et al. | |
| 2016/0072210 A1 | 3/2016 | Armstrong et al. | |
| 2016/0169513 A1 | 6/2016 | Sobol et al. | |
| 2016/0221115 A1 | 8/2016 | Loeffel et al. | |
| 2017/0276350 A1 * | 9/2017 | Schilp | F23R 3/002 |

FOREIGN PATENT DOCUMENTS

| | | |
|---|---|---|
| JP | 2003214300 A | 7/2003 |
| WO | WO2008050028 A2 | 5/2008 |
| WO | WO2008050028 A3 | 8/2008 |
| WO | WO2009126403 A2 | 10/2009 |
| WO | WO2009148680 A1 | 12/2009 |
| WO | WO2013169788 A2 | 11/2013 |
| WO | WO2013169788 A3 | 11/2013 |
| WO | WO2015023733 A1 | 2/2015 |
| WO | WO2015185320 A1 | 12/2015 |

OTHER PUBLICATIONS

U.S. Appl. No. 15/367,265, filed Dec. 2, 2016.
U.S. Appl. No. 15/367,274, filed Dec. 2, 2016.

* cited by examiner

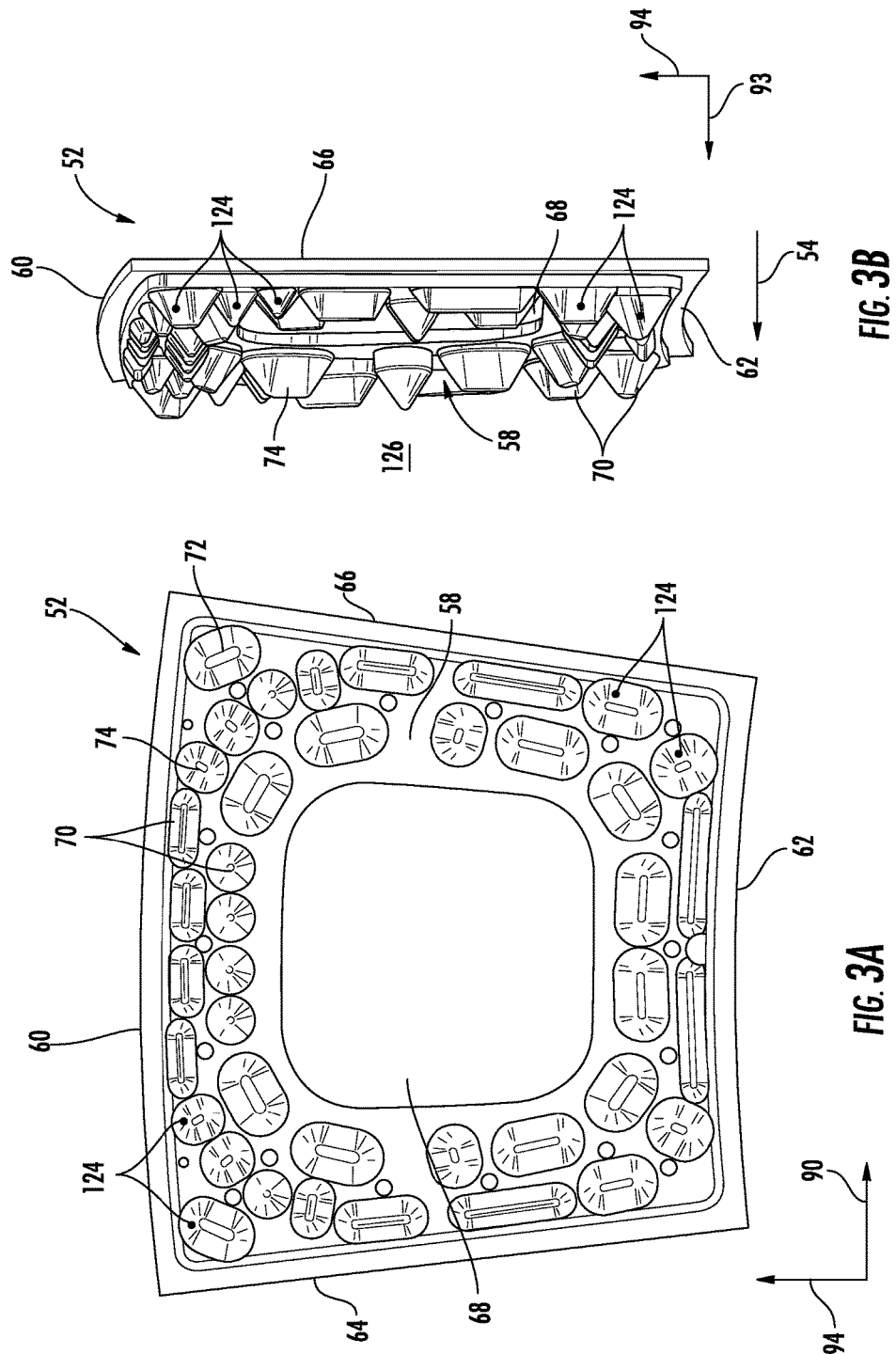

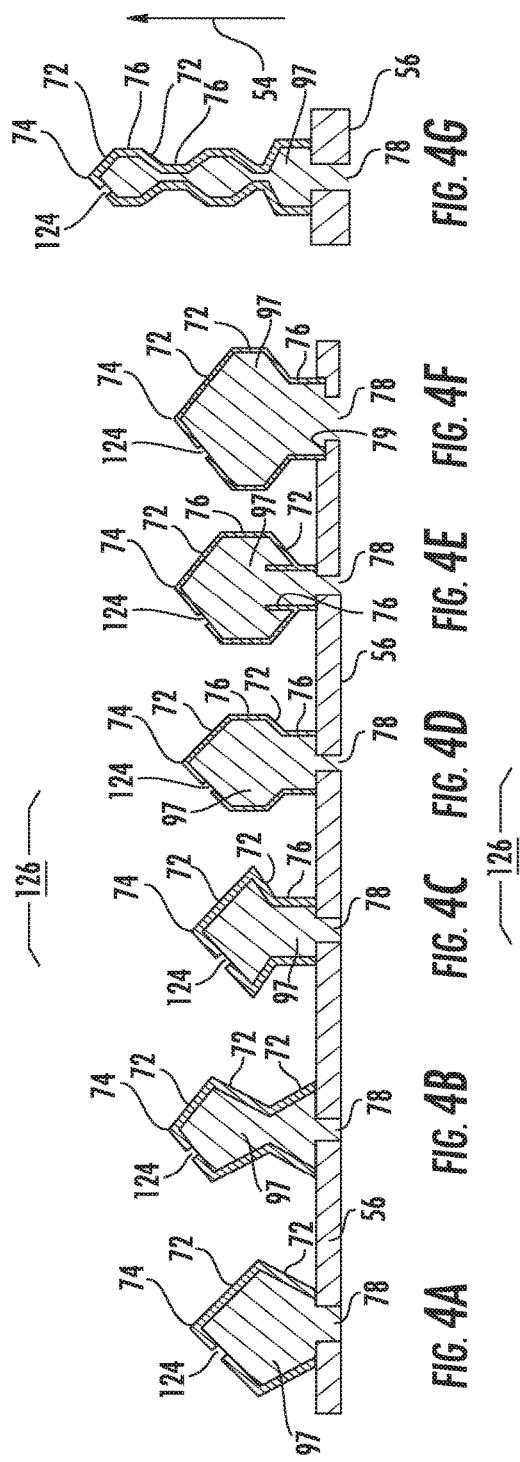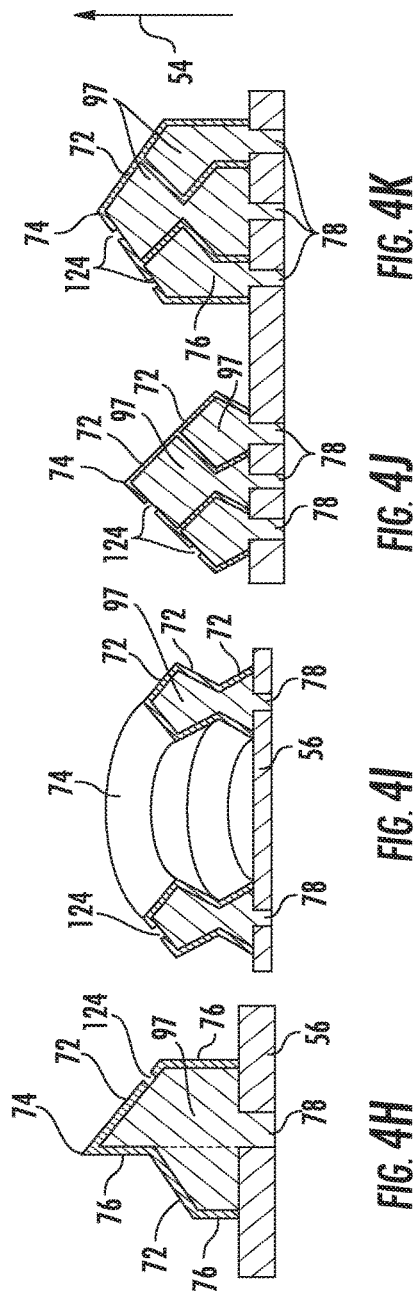

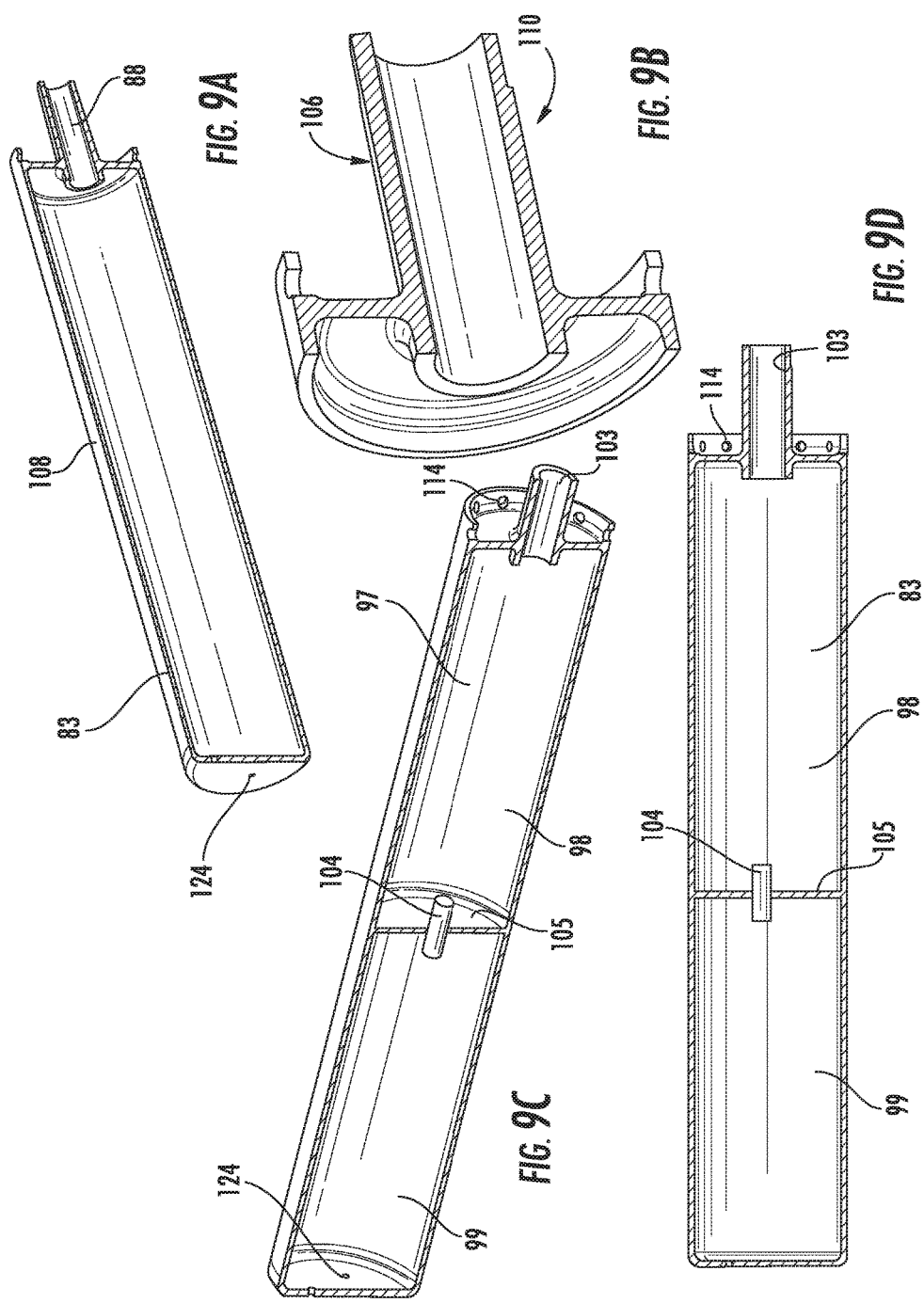

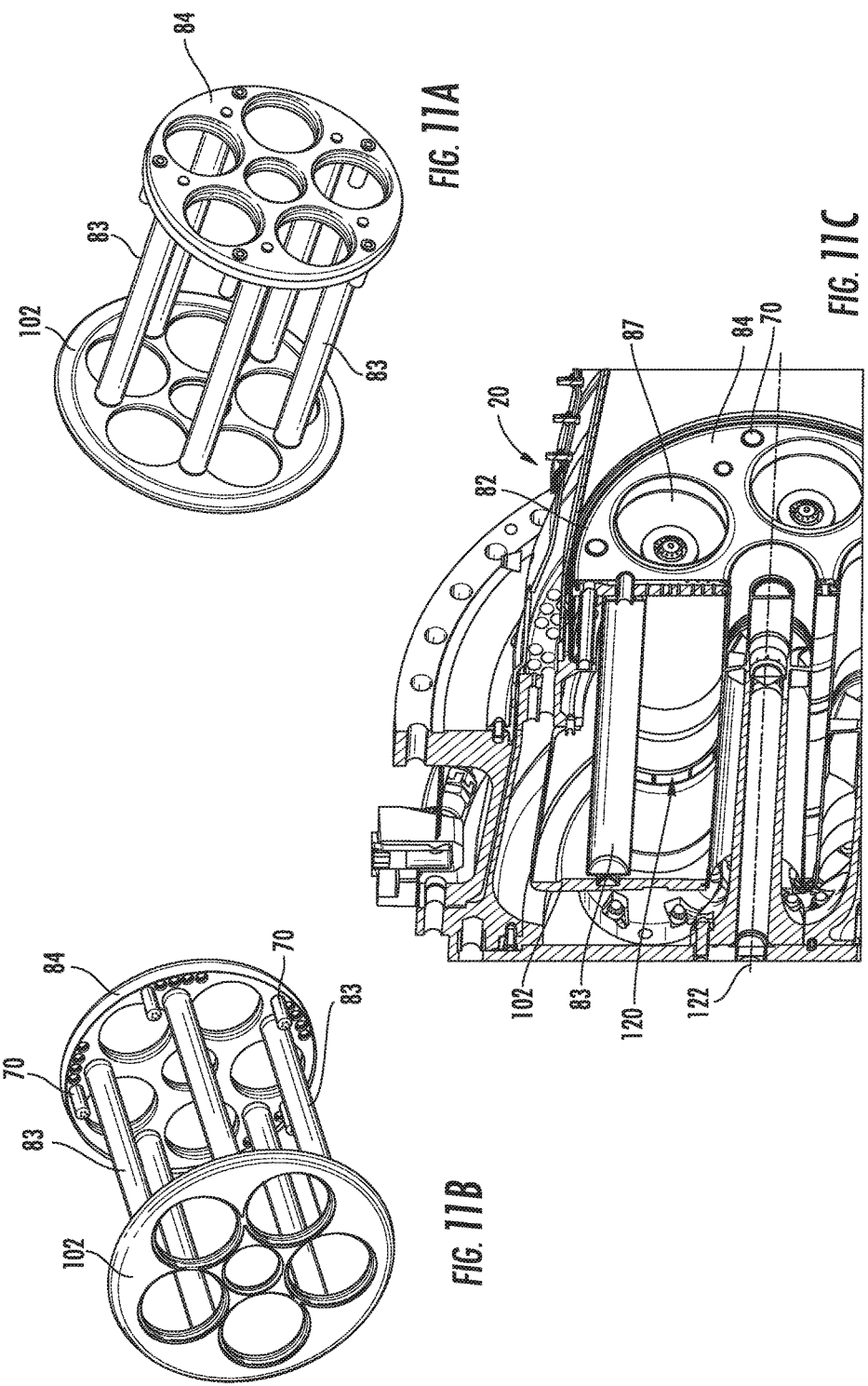

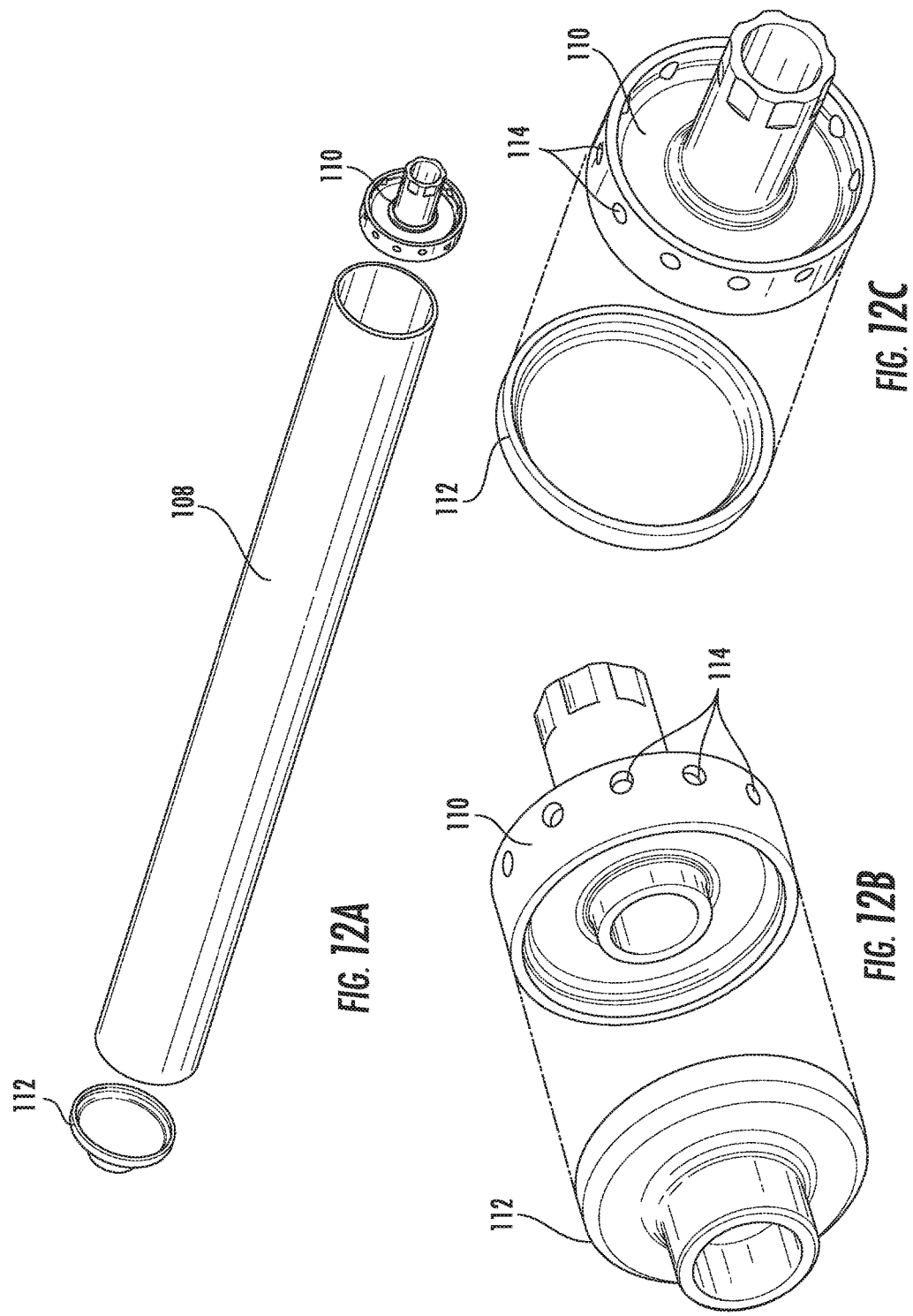

METHOD AND APPARATUS FOR GAS TURBINE COMBUSTOR INNER CAP AND HIGH FREQUENCY ACOUSTIC DAMPERS

FIELD OF THE DISCLOSURE

The disclosure relates generally to gas turbines, and more specifically, to devices and methods for making gas turbine combustor inner caps with acoustic damping that mitigates combustion dynamic pressure pulses.

BACKGROUND OF THE DISCLOSURE

Destructive acoustic pressure oscillations, or pressure pulses, may be generated in combustors of gas turbine engines as a consequence of normal operating conditions depending on fuel-air stoichiometry, total mass flow, and other operating conditions. The current trend in gas turbine combustor design towards low emissions required to meet federal and local air pollution standards has resulted in the use of lean premixed combustion systems in which fuel and air are mixed homogeneously upstream of the flame reaction region. The fuel-air ratio or the equivalence ratio at which these combustion systems operate are much "leaner" compared to more conventional combustors in order to maintain low flame temperatures which in turn limits production of unwanted gaseous NOx emissions to acceptable levels. Although this method of achieving low emissions without the use of water or steam injection is widely used, the combustion instability associated with operation at low equivalence ratio also tends to create unacceptably high dynamic pressure oscillations in the combustor which can result in hardware damage and other operational problems. A change in the resonating frequency of undesired acoustics are also a result of the pressure oscillations. While current devices in the art aim to eliminate, prevent, or reduce dynamic pressure oscillations, the current devices fail to address both high frequency and low frequency damping devices integrated at specific locations on the inner cap, also referred to as combustor front panel.

Combustion acoustics in gas turbine engines can occur over a range of frequencies. Typical frequencies are less than 1000 Hz. However under certain conditions high acoustic amplitudes for frequencies in the 1000 to 10,000 Hz range are possible. Both low frequency and high frequency acoustic modes can cause rapid failure of combustor hardware due to high cycle fatigue. The increase in energy release density and rapid mixing of reactants to minimize NOx emissions in advanced gas turbine combustors enhance the possibility of high frequency acoustics.

Additive manufacturing technologies can be used for making combustor inner caps, acoustic dampers, and other gas turbine structures, including technologies such as binder jetting, directed energy deposition, material extrusion, material jetting, powder bed fusion, sheet lamination, and vat photo-polymerization. Specifically, metallic parts can be additively manufactured using, for instance, selective laser melting, selective electron beam melting processes, and direct metal laser melting (DMLM). In these processes, layers of metallic powder are disposed. A laser beam or electron beam is directed onto the bed of metallic powder, locally melting the powder, and the beam is subsequently advanced on the powder surface. Molten metallic substance solidifies, while the metallic powder at a neighboring location is molten. Thus, a layer of solidified metal is generated along the beam trajectory. After a processing cycle in a layer of material is finished, a new layer of metal powder is disposed on top, and a new cycle of melting and subsequently solidifying the metal is carried out. In choosing the layer thickness and the beam power appropriately, each layer of solidified material is bonded to the preceding layer. Thus, a metallic component is built along a build direction of the manufacturing process. The thickness of one layer of material is typically in a range from 10 to 100 micrometers. The process advance or build direction from one layer to a subsequent layer typically is from bottom to top in a geodetic sense.

Limitations can also apply to these methods. For instance, if an overhang structure is manufactured in one layer, the overhang structure will bend without support for any new layer of applied solidified material. As a result, a weak product quality may be found, or the manufacturing process might be canceled. While a remedy for this situation might be to manufacture support structures below overhang structures, and subsequently removing the support structures, it is obvious that an additional manufacturing step involving a removal process, in particular a cutting or chip removing process, will be required, requiring an additional process step, thus adding manufacturing time, and cost. Moreover, for certain geometries manufactured, it might not be possible or very difficult to access and remove the support structures.

BRIEF DESCRIPTION OF THE DISCLOSURE

Aspects and advantages of the disclosure will be set forth in part in the following description, or may be obvious from the description, or may be learned through practice of the disclosure.

In one embodiment, a method of making a combustor first inner cap is disclosed using the additive manufacturing process of consecutively adding material to a combustor first inner cap along an upstream axial build direction starting from a base side positioned transverse to the upstream axial build direction. Then adding material in consecutive steps to manufacture the first inner cap having at least one combustor that houses the first inner cap. The base side has at least one acoustic port. A bump side extends from the base side into the upstream axial build direction and has at least one damper positioned it. The damper has at least one overhang ledge forming an angle $\alpha$ with the upstream axial build direction less than or equal to 45 degrees.

In another embodiment, a combustor first inner cap producible by the method described above is disclosed having at least one combustor that houses the first inner cap. The base side has at least one acoustic port. A bump side extends from the base side into the upstream axial build direction and has at least one damper positioned it. The damper has at least one overhang ledge forming an angle $\alpha$ with the upstream axial build direction less than or equal to 45 degrees.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIGS. 3A and 3B show additional views of an embodiment of a first inner cap with high-frequency dampers;

FIGS. 4A-4K show various high-frequency damper embodiments;

FIGS. 9A-9B show views of a single damping volume embodiment and FIGS. 9C-9D show views of a double damping volume embodiment of an extended low-frequency damper;

FIGS. 11A-11C show views of another extended low-frequency damper embodiment;

FIGS. 12A-12C show views of portions of a tubular extended low-frequency damper embodiment;

Figure 1:
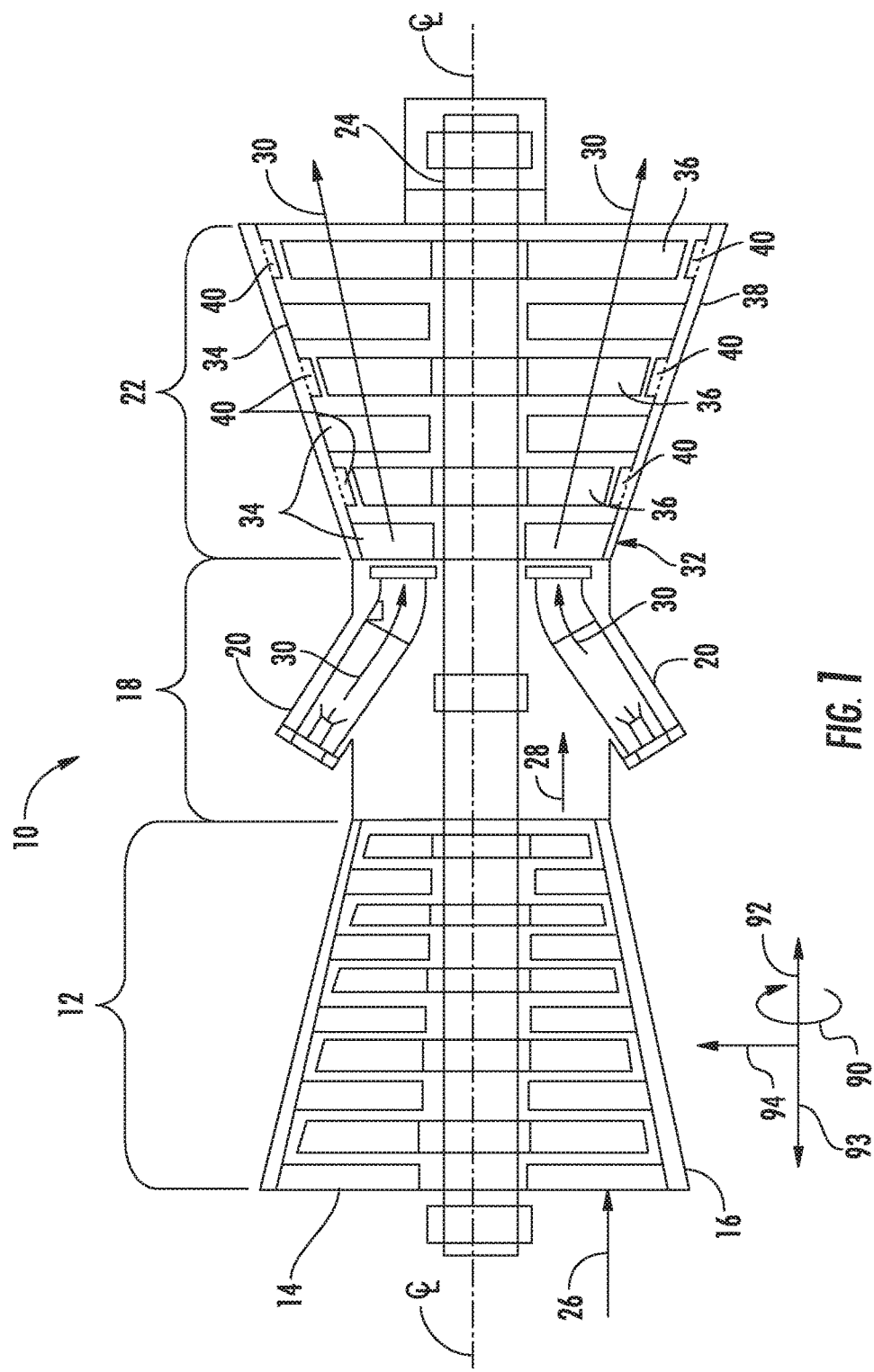
FIG. 1 is a schematic of a typical gas turbine having combustors suitable for having embodiments disclosed herein.
Figure 2A:
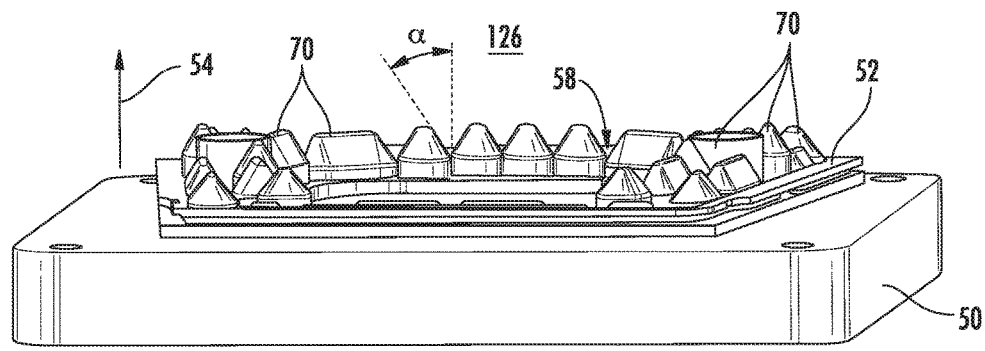
FIGS. 2A and 2B show views of an embodiment of a first inner cap with high-frequency dampers.
Figure 2B:
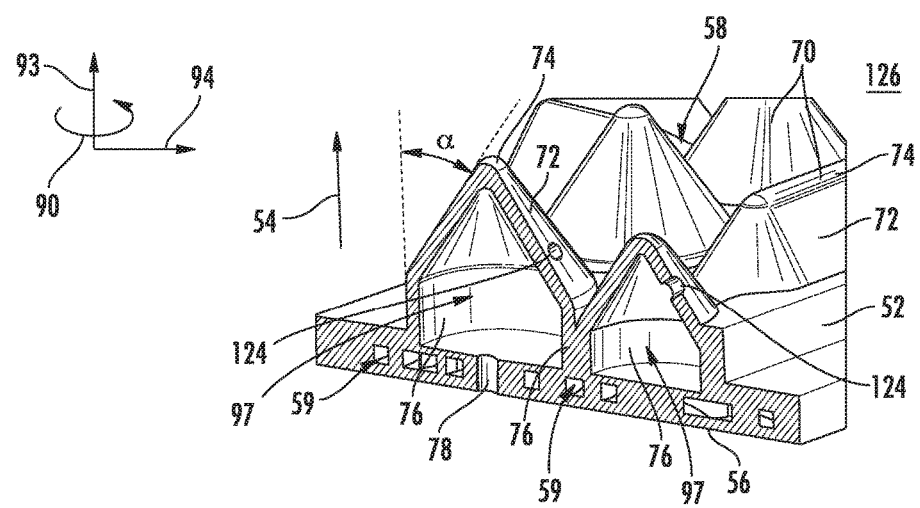
Figure 5A:
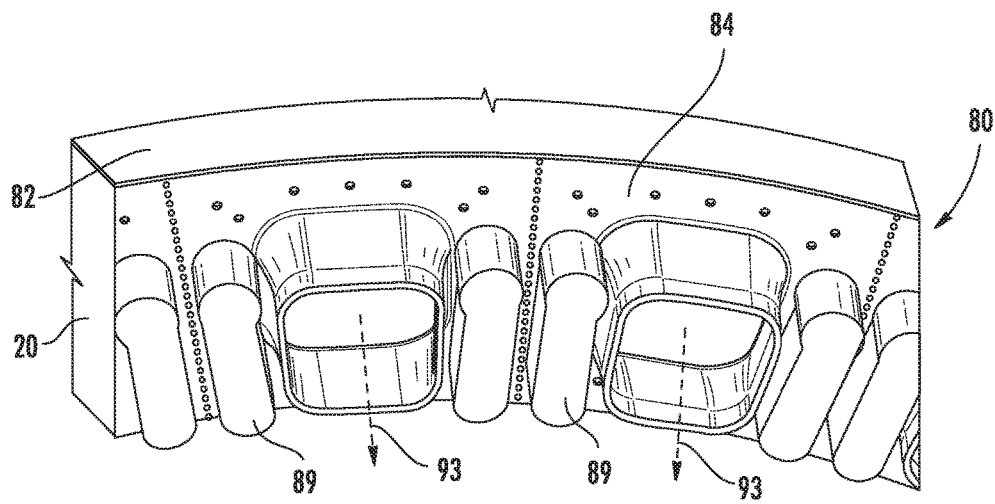
FIGS. 5A and 5B show views of damper embodiments attached to a second inner cap.
Figure 5B:
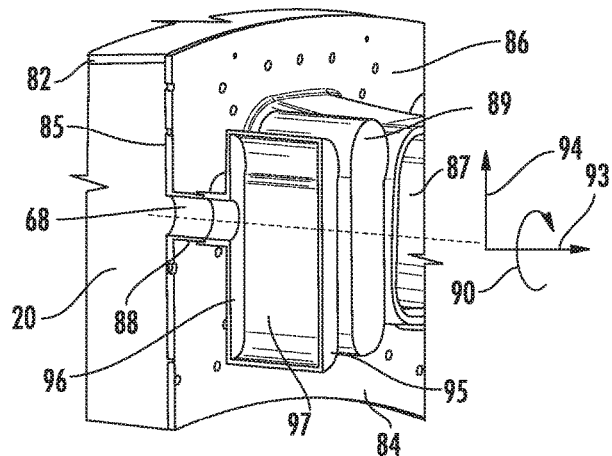
Figure 6A:
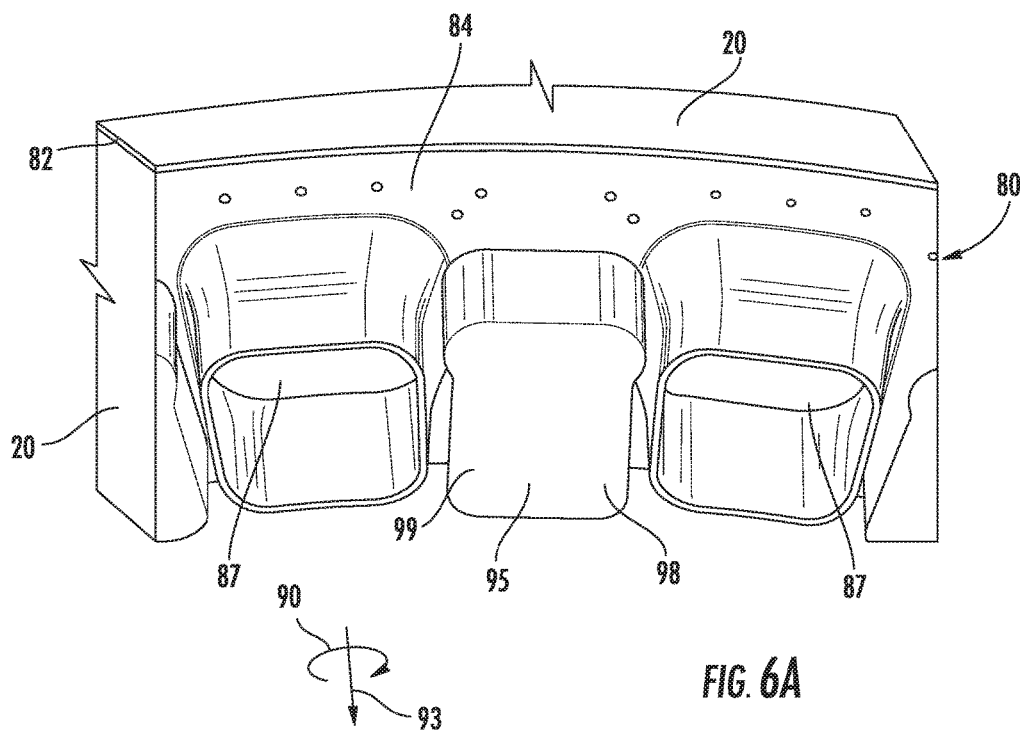
FIGS. 6A and 6B show views of another damper embodiment attached to a second inner cap.
Figure 6B:
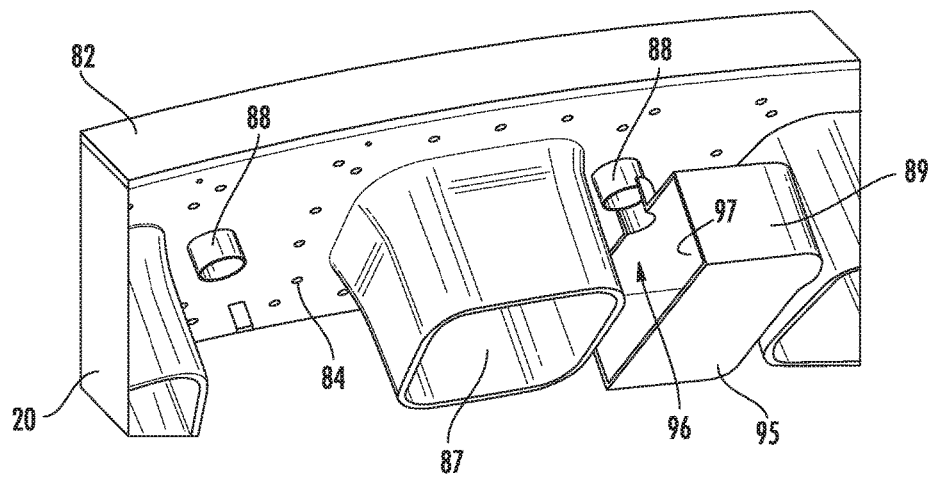
Figure 7:
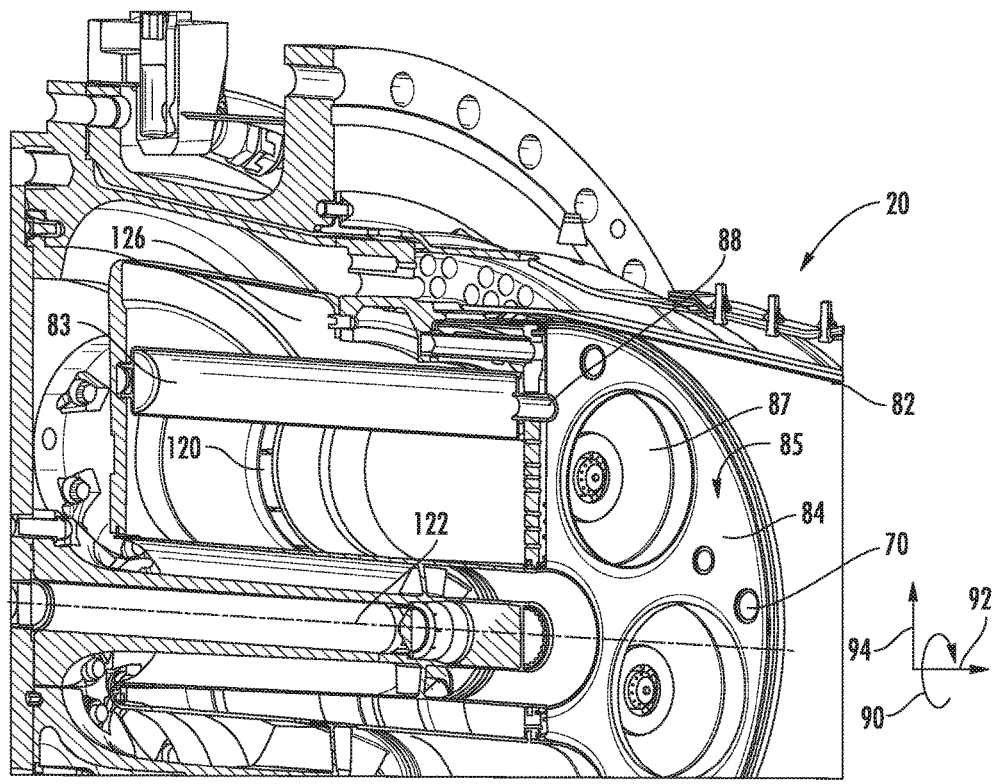
FIG. 7 is a perspective of a portion of a typical combustor suitable for having extended resonating tube embodiments disclosed herein.
Figure 8A:
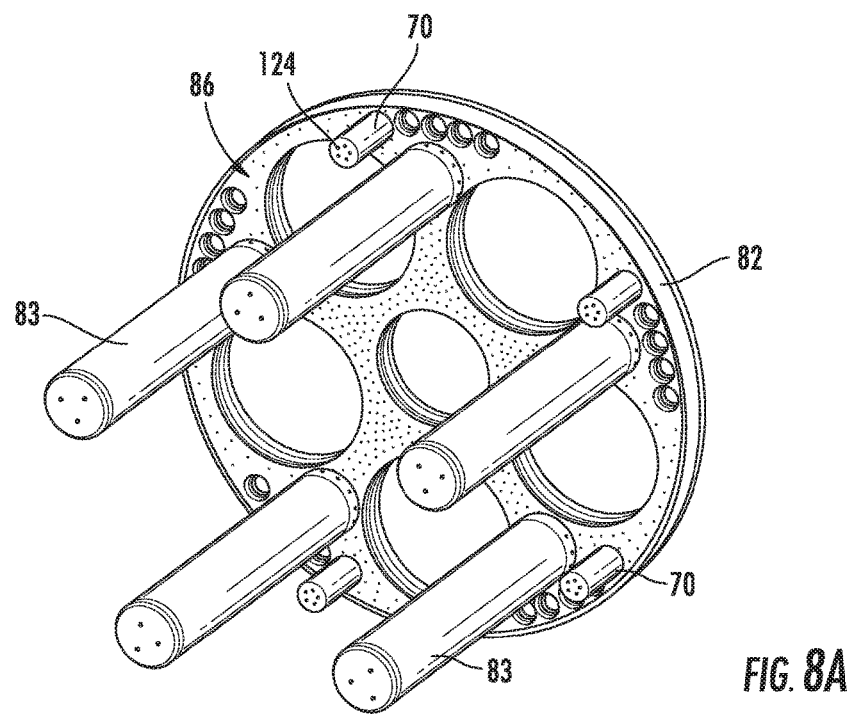
FIGS. 8A and 8B show views of a combined high and low frequency extended damper embodiment attached to a second inner cap.
Figure 8B:
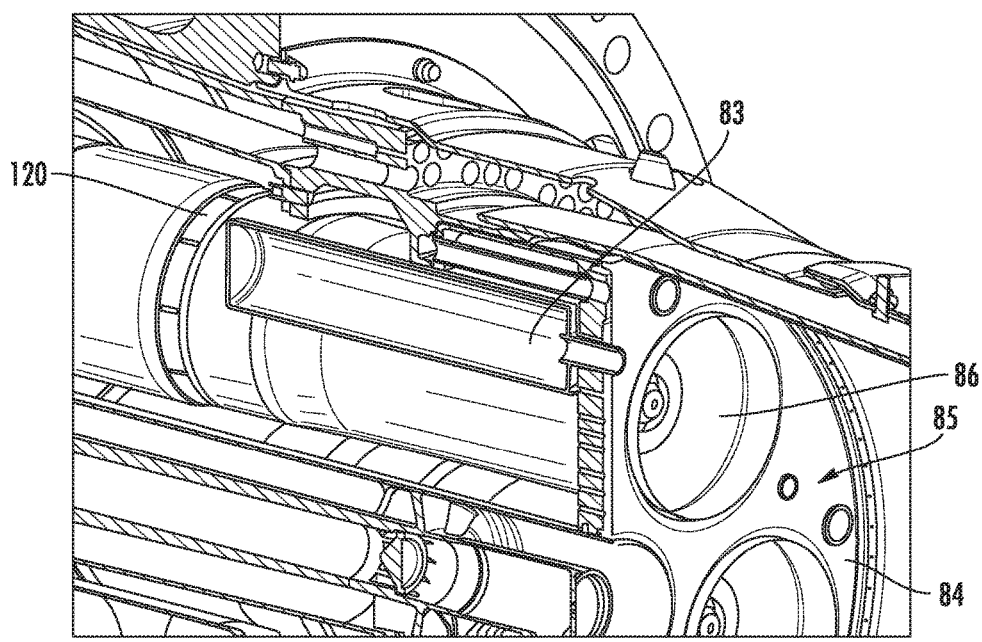

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component. The terms "high frequency" and "low frequency" are defined herein as; low frequency is less than or equal to 1000 Hz; high frequency is greater than 1000 Hz. When describing whether a certain stated frequency is "within approximately n (Hz)" of a certain value, it is meant that the stated value is within plus or minus approximately n, unless otherwise stated. "Target frequency" as used herein is meant to describe the range at which the combustor is meant to operate, or the frequency at which a dampening device is designed to be most effective (i.e., where the absorption coefficient is approximately 1, or 100%). "Resonating frequency" is meant to describe the actual frequency at which the combustor is operating, including times during which acoustic pressure oscillations are occurring.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine including but not limited to an aero-derivative turbine, marine gas turbine as well as an aero engine turbine, unless specifically recited in the claims.

In one embodiment, additive manufacturing generates a first inner cap 52 that avoids temporary supports, for overhang ledges 72 (inclined surfaces), which can stop the printing process. A first inner cap 52 with high frequency dampers 70 is disclosed that is compatible with the additive process such that the part orientation and upstream axial build direction 54 require no temporary supports during part manufacturing. Additionally, the high frequency dampers are shaped to avoid overhang ledges 72 and are distributed throughout the first inner cap to reduce the weight of cap by about 50%.

Referring now to the drawings, wherein like numerals refer to like components, FIG. 1 illustrates an example of a gas turbine 10 as may incorporate various embodiments of the present invention. Directional orientation, consistent in all figures, is defined as circumferential direction 90, downstream axial direction 92, upstream axial direction 93, and radial direction 94. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

In FIGS. 2A-3B, a direct metal laser melting (DMLM) process uses a metal powder disposed on a build platform 50 in consecutive layers. Between each disposal step the actual laser melting process takes place. A laser beam of appropriate power is directed onto the metal powder, and advanced on the surface of the metal powder, such that the metal powder is locally melted and subsequently re-solidified. By repeating the steps of disposing metal powder, melting, and re-solidifying, a first inner cap 52 is built. The process of disposing one layer above another advances along the upstream axial build direction 54 which may generally be referred to as base side to apex. The upstream axial build direction 54 is generally parallel with the upstream axial direction 93 for the combustor containing the first inner cap 52. Typically, the thickness of each layer is from about 10 to about 100 micrometers.

The first inner cap 52 is thus manufactured starting from a base side 56. In order to manufacture an overhang structure, the overhang structure is manufactured such that it is tilted against the upstream axial build direction 54 at an angle α less than or equal to 45 degrees. As previously mentioned, the upstream axial build direction 54 may typically be from base side to apex. In manufacturing an additional layer of the first inner cap 52, the cantilevered portion, determined by the layer thickness and angle α, is small enough to bear its own weight and the weight of powder disposed on top of it in subsequent build steps. With a typical thickness in a range from 10 to 100 micrometers, and a build angle α less than or equal to 45 degrees, the cantilevered portion will be less than about 145 micrometers. As a result, hip roof-type or pyramid-type overhang structures can be manufactured without support structures. The internal damping volume of each damper can be sized for specific acoustic damping frequencies.

As seen in FIGS. 3A & 3B, the first inner cap 52 comprises a base side 56, a bump side 58, an outer side 60, an inner side 62, and a first radial side 64 and an opposing second radial side 66. The base side 56 can have at least one cooling channel 59 integrated with the base side 56. A through opening 68 is provided in the first inner cap 52 to allow flow of hot gas or passage of other combustor components. An upstream axial build direction 54 of the manufacturing process is indicated. The bump side 58, also referred to as the cold side, is furnished with a multitude of high-frequency dampers 70. These high-frequency dampers 70 typically are projections on the bump side 58 serving as acoustic dampers.

The high-frequency dampers 70 can have a purge holes 124 that provide fluid communication between the combustor cooling chamber 126 and the damper chamber 97. In particular, the purge holes 124 can increase cooling, but in other embodiments the purge holes 124 may be absent to eliminate fluid communication. When present, the purge holes 124 provide an increased cooling effect because cooling air enters into the damper chamber 97 from the combustor cooling chamber 126 via the purge holes 124 and cools the damping volume inside the damper chamber 97. The cooled damping volume then flows out from the damper chamber 97 through the opening 68 into the combustion gases. The high-frequency dampers 70 are manufactured without support structures, and thus without need for subsequent cutting of the support structures during the additive manufacturing process. The high-frequency dampers 70 are generally hip-roof shaped, pyramid shaped, or polygonal shaped.

The high-frequency dampers 70 can have an apex 74 on the bump side 58 with overhang ledges 72 extending from the apex 74 boundaries. The overhang ledges 72 are tilted against upstream axial build direction 54 at an angle α of less than or equal to 45 degrees. The damper 70 can also include extension ledges 76 that extend generally parallel with the upstream axial build direction 54. Extension ledges 76 can extend from overhang ledges 72 or the bump side 58. Extension ledges 76 and overhang ledges 72 can extend any distance thereby adjusting the damping volume inside the high-frequency dampers 70. Generally, an overhang ledge 72 comprises a ledge surface extending at an angle α from parallel with the upstream axial build direction 54, while the extension ledge 76 comprises a ledge surface extending generally parallel with upstream axial build direction 54. Purge holes 124 can be disposed on any overhang ledge 72 or extension leg 76. The base side 56 can have at least one acoustic port 78 allowing fluid communication between the internal damping volume of the high-frequency dampers 70 and combustion gases in the combustor 20. Acoustic ports 78 generally penetrate the base side 56 and are open to the internal damping volume of the high-frequency dampers 70 to allow passage of destructive acoustic pressure oscillations from the combustor 20 into the damper 70. A plurality of acoustic ports 78 can serve each damper 70. The acoustic ports 78 can be sized frequency specific to allow passage of the most damaging acoustic pressure oscillations into the damper 70.

Exemplary configurations of high-frequency dampers 70 as may be producible by the method disclosed herein are shown in FIGS. 4A through 4K. FIG. 4A shows two stacked alternating angle overhang ledges 72 extending from the base side 56 to the apex 74. FIG. 4B shows three stacked alternating angle overhang ledges 72 extending from the base side 56 to the apex 74. FIG. 4C shows an extension ledge 76 extending from the base side 56 with two stacked alternating angle overhang ledges 72 further extending to the apex 74. FIG. 4D shows an extension ledge 76 extending from the base side 56 to an overhang ledge 72 further extending to another extension ledge 76 and then another overhang ledge 72 terminating at the apex 74. FIG. 4E shows a configuration with lengthened extension ledges 76 positioned at the acoustic port 78 perimeter boundary. The lengthened extension ledges 76 are used to optimize the damper efficiency. FIG. 4F shows a base side cutout 79 configuration that shortens the acoustic port 78 for optimizing damper efficiency. FIG. 4G shows three stacked polygonal shapes interconnected with extension ledges 76. FIG. 4H shows a mixture of various lengths of extension ledges 76 and overhang ledges 74 extending from the base side 56 to the apex 74. FIG. 4I shows an annular interconnection of FIG. 4B shaped dampers with multiple acoustic ports 78. FIG. 4J shows a central portion FIG. 4B shaped damper surrounded by an outer annularly interconnected portion of FIG. 4A shaped dampers with multiple acoustic ports 78, each portion having separate acoustic ports 78. FIG. 4K shows a central portion FIG. 4B shaped damper surrounded by an outer annular interconnection of extension ledges 76 topped with overhang ledges 72, each portion having separate acoustic ports 78. It will become immediately clear to the skilled person how the embodiments shown in FIGS. 4A through 4K are producible by a method as disclosed herein as part of the first inner cap 52 as shown in FIG. 1A through 2B.

Another embodiment can have low frequency dampers (LFD) 89, also known as resonating tubes, as shown in FIGS. 5A-6B, that can be welded to specially prepared neck rings 88 of the second inner cap 84. Welds are placed inside neck rings 88 with the LFD's 89 being located at positions to effectively attack various frequencies of pulsation. Two separate LFD 89 volumes can be welded to each second inner cap 84, each LFD volume having a target volume that fits between burner openings 87 and allows easier welding procedure for installation. Many configurations of the LFD's 89 are presented herein. The location of LFD's 89 simplifies the assembly process wherein the LFD 89 welded structure is joined to the back surface of second inner cap 84 with no sealing necessary between the cold surface 86 and hot surface 85 thus making the LFD 89 independent from thermal movements between hot and cold surfaces 85, 86.

The embodiment, as shown in FIGS. 5A-6B, can have a damping system 80 for dampening acoustic pressure oscillations of a gas flow in a combustor 20 of a gas turbine engine 10 with at least one combustor 20 with a combustor liner 82. A second inner cap 84 portion is disposed on the at least one combustor 20 and can have a hot surface 85, a cold surface 86, at least one burner opening 87 protruding from the cold surface 86, at least one neck ring 88, having an internal opening 68, protruding from the cold surface 86, and at least one resonating tube 89 integrated with and protruding from the at least one neck ring 88. The burner openings 87 can be shaped to match any burner profile including annular, rectangular, or irregular shaped burners. The at least one resonating tube 89 is disposed between adjacent burner openings 87. The at least one resonating tube 89 is constructed such that the radial 94 dimension is greater than or equal to the upstream axial 93 dimension.

The damping system 80 at least one resonating tube 89 can have a closed end 95, an open end 96 comprising a neck opening 68, and at least one damper chamber 97 therebetween, the at least one damper chamber 97 being in fluid communication, through the neck opening 68, with an interior of the at least one combustor 20. Also, at least one damper chamber 97 can have a first damping volume 98 in fluid communication with the neck opening 68 and a second damping volume 99 in fluid communication with the neck opening 68. The first damping volume 98 can be in fluid communication with the second damping volume 99. The first and second damping volumes 98, 99 can be approximately equal or different.

The damping system 80 can also be configured so that the second inner cap 84 portion is disposed as an annulus and aligned approximately perpendicular to the centerline of the combustor 20. Additionally, the damping system 80 resonating tube 89 opening 68 can be fixedly coupled to a respective at least one neck ring 88.

The damping system 80 resonating tube 89 can be configured to dampen acoustic pressure oscillations resonating at a target frequency less than or equal to about 1000 Hz. Additionally, the first and second damping volumes 98, 99 can be configured to dampen acoustic pressure oscillations resonating at two different target frequencies less than or equal to about 1000 Hz.

In another embodiment, LFD's, sometimes referred to as Helmholtz dampers, resonators or resonating tubes 89, can be attached to the second inner cap 84 of the combustor. Typically, a single neck ring 88 enters the combustion chamber 20 per LFD 89. This arrangement positions the resonating tube 89 at a very efficient location thereby providing the same damping performance with smaller LFD 89 volumes. The LFD's 89 can also be positioned in the space between the fuel injector swozzles 120 (swirler nozzle) that is typically not fully utilized thereby not affecting the overall architecture of the combustor 20. The LFD's 89 can also be field installed for conversion, modification and upgrades to existing turbines. Typical orientation of these LFD's 89 can be approximately parallel to the combustor 20 axis, or about +/−15 degrees from the combustor axis. The neck ring 88 can face the combustion chamber 20 on the hot surface 85 of the second inner cap 84.

The embodiments shown in FIGS. 7-13 disclose a damping system 80 for dampening acoustic pressure oscillations of a gas flow in a combustor 20 of a gas turbine 10 engine is disclosed that can have at least one combustor 20 comprising a combustor liner 82. A second inner cap 84 portion can be disposed on the at least one combustor 20, with the second inner cap 84 portion having a hot surface 85, a cold surface 86, and at least one burner opening 87 protruding from the cold surface 86. The burner openings 87 can be shaped to match any burner profile including annular, rectangular, or irregular shaped burners. At least one neck ring 88 having an internal opening can protrude from the cold surface 86. At least one extended resonating tube 83 can have a resonating tube neck, and can be integrated with and protruding from the at least one neck ring 88. The at least one extended resonating tube 83 can be disposed between adjacent burner openings 87. The at least one extended resonating tube 83 is configured such that the radial 94 dimension is less than the upstream axial 93 dimension. Also, the at least one extended resonating tube 83 can have a closed end 95, an open end 96, and at least one damper chamber 97 therebetween, the at least one damper chamber 97 being in fluid communication with an interior of the at least one combustor 20.

Figure 10A:
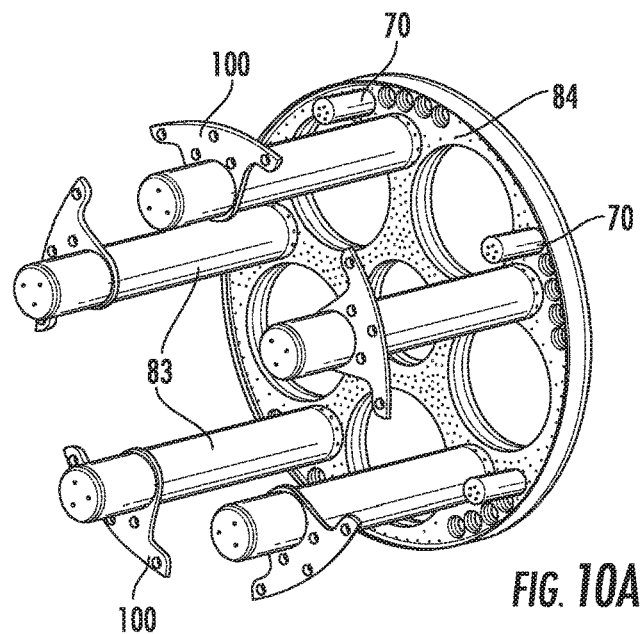
FIGS. 10A and 10B show views of another extended low frequency damper embodiment with alternative fixation.
Figure 10B:
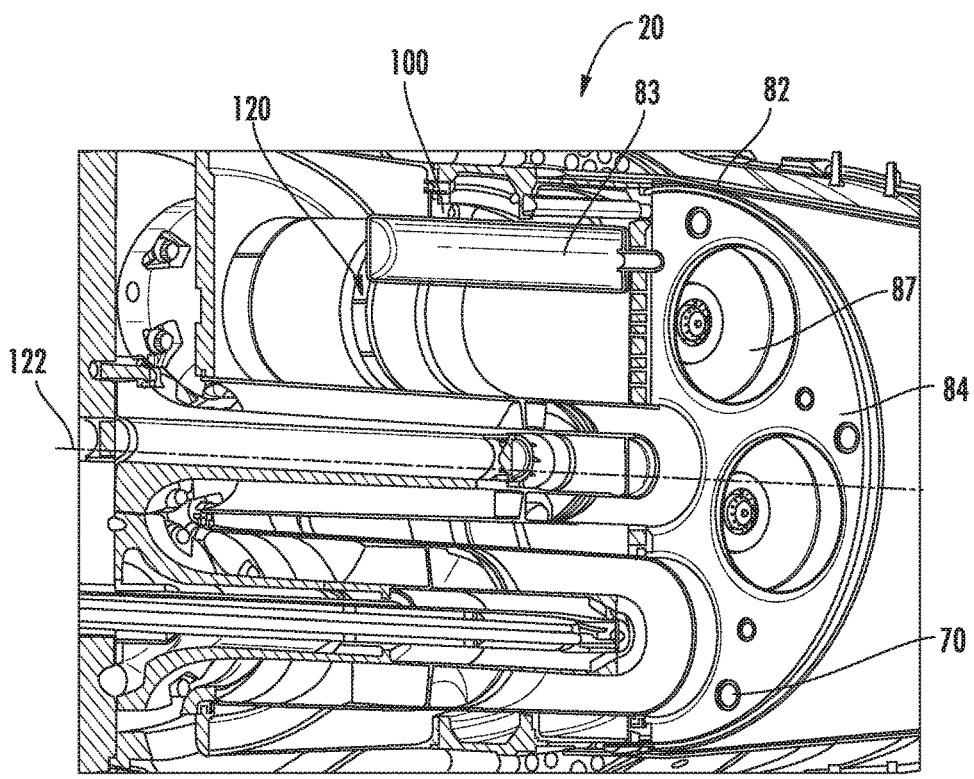

In FIGS. 10A and 10B, the extended resonating tube 83 can also have a support plate 100 disposed proximate the closed end 95 upstream of the second inner cap 84. The support plate 100 can be removably disposed to the combustor liner 82. In other embodiments shown in FIGS. 11A-11C, the extended resonating tube 83 can have a plena cover 102 disposed proximate the closed end 95 upstream of the second inner cap 84. The plena cover 102 can be disposed on the combustor liner 82.

FIGS. 9A-9B show views of a single damping volume embodiment and FIGS. 9C-9D show views of a double damping volume embodiment of an extended resonating tube 83. The extended resonating tube 83 can have a first damping volume 98 with a first neck portion 103 proximate the open end 96, coupled to a second damping volume 99 having a second neck portion 104 disposed in a separator 105 positioned about midway in the extended resonating tube 83. A flanged annulus 106 portion can at least partially surrounding the first neck portion 103 and can also be coupled to the second inner cap 84.

Figure 13A:
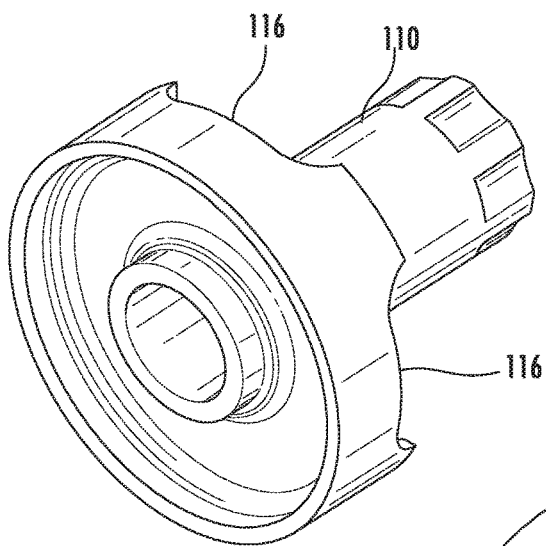
FIGS. 13A-13C show views of an extended damper open end cap embodiment.
Figure 13B:
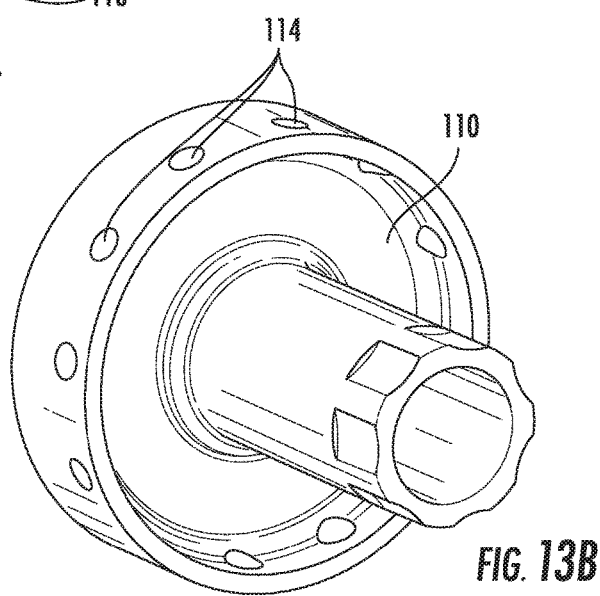
Figure 13C:
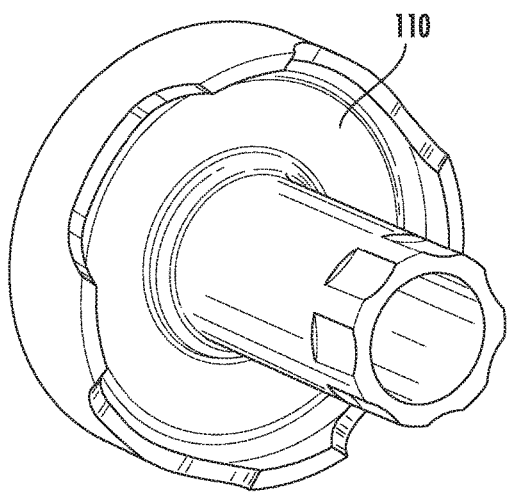

Additionally, as shown in FIGS. 12 and 13, the extended resonating tube 83 can have a tubular portion 108 with an open end cap 110 disposed proximate the open end 96, and a closed end cap 112 disposed proximate the close end 95. The open end cap 110 can have cooling air ports 114 configured as cut outs 116, cylindrical openings, and mixtures thereof.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of making a combustor cap assembly using an additive manufacturing process, the method comprising:
consecutively adding material along an upstream axial build direction to produce a base side positioned transverse to the upstream axial build direction, wherein the step of consecutively adding material to produce a base side results in a plurality of acoustic ports being defined through the base side; and
consecutively adding material to the base side in the upstream axial build direction to produce a bump side integrally formed with the base side, the bump side comprising a plurality of dampers,
wherein each damper of the plurality of dampers comprises a longitudinal axis parallel to the upstream axial build direction and a hollow body symmetrical about the longitudinal axis, the hollow body having at least one inclined face and an apex at a boundary of the at least one inclined face distal to the base side, the apex being aligned with the longitudinal axis; and wherein the hollow body defines a damper chamber therein, the damper chamber being in fluid communication with at least one of the plurality of acoustic ports.

2. The method of claim 1, wherein the additive manufacturing process is direct metal laser melting (DMLM).

3. The method of claim 1, wherein the step of consecutively adding material to produce the bump side produces a first damper of the plurality of dampers comprising a purge hole disposed through the at least one inclined face of the first damper, the purge hole being in fluid communication with a respective damper chamber of the first damper.

4. The method of claim 1, wherein the step of consecutively adding material to produce the bump side comprises consecutively adding material in layers having a common profile to produce at least one extension ledge in at least one damper of the plurality of dampers, the at least one extension ledge extending in the upstream axial build direction parallel to the longitudinal axis.

5. The method of claim 1, wherein the step of consecutively adding material to produce the base side further comprises depositing the material in such a manner as to define at least one cooling channel extending in a direction transverse to the upstream axial build direction.

6. The method of claim 1, wherein the step of consecutively adding material to produce the bump side comprises depositing a first series of layers of a common profile and different sequential sizes, wherein each layer of the first series of layers is stacked in the upstream axial build direction in overhanging fashion relative to a subsequent layer to produce the at least one inclined surface.

7. The method of claim 6, wherein the depositing of the first series of layers comprises depositing a first subset of layers with a sequentially decreasing size and subsequently depositing a second subset of layers with a sequentially increasing size on the first set of layers in the upstream axial build direction.

8. The method of claim 1, wherein the step of consecutively adding material to produce the bump side comprises depositing a first closed shape and a second closed shape in layers, the first closed shape being radially inward of and concentric with the second closed shape relative to the longitudinal axis; and wherein the first closed shapes in layers have a sequentially increasing or decreasing size in the upstream axial build direction, and the second closed shapes in layers have an opposing sequentially decreasing or increasing size in the upstream axial build direction to produce a damper of the plurality of dampers having annularly interconnected surfaces.

9. The method of claim 1, wherein the step of consecutively adding material to produce the bump side comprises consecutively adding layers to produce a damper having a central portion surrounded by an outer annularly interconnected portion; and wherein the central portion defines a central damper chamber in fluid communication with a first acoustic port of the plurality of acoustic ports, and the outer annularly interconnected portion defines an annular damper chamber in fluid connection with a second acoustic port of the plurality of acoustic ports.

10. A combustor cap assembly comprising:
a base side comprising a plurality of acoustic ports; and
a bump side integrated with and extending from the base side in an upstream axial direction, the bump side comprising a plurality of dampers, wherein each damper of the plurality of dampers comprises a longitudinal axis parallel to the upstream axial direction and a hollow body symmetrical about the longitudinal axis, the hollow body having at least one inclined face and an apex at a boundary of the at least one inclined face distal to the base side, the apex being aligned with the longitudinal axis; and wherein the hollow body defines a damper chamber therein, the damper chamber being in fluid communication with at least one of the plurality of acoustic ports.

11. The combustor cap assembly of claim 10, wherein at least one damper of the plurality of dampers comprises a purge hole disposed through the at least one inclined face, the purge hole being in fluid communication with a respective damper chamber of the at least one damper.

12. The combustor cap assembly of claim 10, wherein at least one damper of the plurality of dampers comprises an extension ledge having a common profile and extending in the upstream axial direction in parallel to the longitudinal axis.

13. The combustor cap assembly of claim 10, wherein the base side further comprises at least one cooling channel extending in a direction transverse to the upstream axial direction.

14. The combustor cap assembly of claim 10, wherein the at least one inclined face is configured to support the apex, such that the damper chamber extends unimpeded from the bump side to the apex.

15. The combustor cap assembly of claim 10, wherein the at least one inclined face of a first damper of the plurality of dampers comprises a first inclined face oriented at a first angle relative to the longitudinal axis and a second inclined face oriented at a second angle relative to the longitudinal axis; wherein the second inclined face is stacked on first inclined face in the upstream axial direction.

16. The combustor cap assembly of claim 15, wherein the stacked first inclined face and second inclined face are annularly interconnected.

17. The combustor cap assembly of claim 10, wherein at least one damper of the plurality of dampers comprises a central portion surrounded by an outer annularly interconnected portion; and wherein the central portion defines a central damper chamber in fluid communication with a first acoustic port of the plurality of acoustic ports, and the outer annularly interconnected portion defines an annular damper chamber in fluid connection with a second acoustic port of the plurality of acoustic ports.

* * * * *